United States Patent [19]
Haile

[11] 3,764,201
[45] Oct. 9, 1973

[54] REAR VISION MIRROR
[75] Inventor: Ernest Haile, Trenton, N.J.
[73] Assignee: Allen C. Haile, Carson, Calif.
[22] Filed: May 17, 1972
[21] Appl. No.: 254,244

[52] U.S. Cl................................. 350/303, 350/307
[51] Int. Cl. ............................................. G02b 5/08
[58] Field of Search.................... 350/293, 303, 304, 350/307, 288

[56] References Cited
UNITED STATES PATENTS
| | | | |
|---|---|---|---|
| 2,778,273 | 1/1957 | Fellmeth | 350/303 |
| 2,279,751 | 4/1942 | Hensley | 350/303 |
| 2,857,810 | 10/1958 | Troendle | 350/293 |

FOREIGN PATENTS OR APPLICATIONS
| | | | |
|---|---|---|---|
| 616,615 | 8/1969 | Germany | 350/293 |
| 1,420,532 | 11/1965 | France | 350/293 |

Primary Examiner—David Schonberg
Assistant Examiner—Michael J. Tokar
Attorney—Harvey B. Jacobson

[57] ABSTRACT

A rear vision mirror for exterior use primarily on trucks and buses and designed for suspended use on the right-hand side of a cab remote from the driver at the left. It is of one piece construction and characterized broadly by a main flat rectangular image and object reflecting area. A first horizontally disposed convex reflecting area borders and merges with the upper transverse marginal edge of the main reflecting area or zone and is curved rearwardly. A second but lower horizontal rearwardly curving convex reflecting area basically like the upper horizontal convex area merges with the lower transverse marginal area of the main reflecting area or zone. A complemental third but vertical convex reflecting area merges with the outer vertical edge of the main reflecting area. The inward longitudinal edge has a right angularly positioned wall of requisite thickness and width. All of the areas whether flat or convexly curved are selectively as well as conjointly viewable in keeping with the particular locale and relationship of the vehicles and objects within the zone or range of usefulness. All convex areas are of corresponding convexity and adjacent terminal end portions of the third area and the first and second areas are united by spherical corner portions. The entire peripheral or marginal edge is provided with narrow flange means capable of mounting the unique mirror in a support bracket or fixture.

5 Claims, 5 Drawing Figures

PATENTED OCT 9 1973 3,764,201

REAR VISION MIRROR

The present invention relates to a rear view or vision mirror which because of its unique construction lends itself to safe and feasible use on support brackets such as are provided on trucks and buses and, more specifically stated, has to do with a simple, practical and economical mirror structure characterized by features which function individually and collectively to first and more safely serve the suspended use primarily on the right hand side remote from the driver and whose features function to reduce dangerous blind spots to a practical miminum.

In carrying out the principles of the inventive concept a mirror of reliable performance is provided, one which, for the most part, is capable of being mounted on frames and brackets which are currently in use on trucks and buses. The mirror is so mounted and adjusted in the frame that the principal or main planar or flat area or zone reflects much in the manner of currently or commonly used rear view mirrors but which has several marginal portions provided with rearwardly and properly curved horizontal and vertical areas and junctional corner portions which contribute to the function of the main mirror so as to enable the driver to see back and out at a broader angle and also enable him to see downward and further forward. In addition experience has shown that the mirror is such in construction and capability that it will enable truck and bus drivers to view the rear wheels of their vehicles which, manifestly, is helpful when called upon to back or park as the case may be. Mirrors commonly in use on trucks and buses are often such that the driver is unable to see small automobiles at the right hand side and in fact objects and signs and curbs which can and often do result in unforeseen and exasperating as well as damaging and difficult-to-cope with situations.

It is a matter of common knowledge that when a truck or bus driver is called upon to slow down at a stop sign or a yield sign on a side road merging with a main highway and often involving a sharp angle on the right hand side, he has difficulty viewing even when the highway to the right appears to be clear. From the driver's seat looking directly out the window in the right door it is quite likely that he cannot envision a safe distance to his right due to the special angle of approach. It follows that in many cases the rear view mirror commonly used does not reflect outward enough to cover the situation, presenting a blind area. It is an object of the present invention to structurally, functionally and otherwise improve upon known mirrors and to provide an adaptation which well and safety serves the purposes for which it has been evolved, produced and successfully used.

Many and varied types and styles of rear view mirrors for trucks and buses have been devised and offered for use but often without success. Take for example the patent to Robert E. Fellmeth, U.S. Pat. No. 2,778,273, which has to do with a rear view mirror for outside bracket supported use characterized by a centrally disposed and substantially flat circular reflecting area marginally encompassed by a spherical convex peripheral reflecting surface which is integral with and completely circumscribes the central area and extends rearwardly therefrom. The patentee suggests a curved marginal portion, but conceivably the curved side portions could meet as curved moldings meet on a picture frame having ridges at the corners and should this be the case there would be obvious and dangerous blind areas at the corners notably out and up as well as down. Fellmeth will not be further discussed except as exemplary prior art. A more pertinent citation would be the Ernest E. Hensley rear view mirror shown in U.S. Pat. No. 2,279,751. Hereagain and despite the fact that the patentee Hensley shows a main rectangular planar mirror and marginal auxiliary mirrors, the latter are planar and at such angles in relation to each other and the main mirror that serious blind areas between the central portion and side apron portions are present. Under the circumstances it would appear that the apron-like marginal components have failed to comply with the requirements of widespread adoption and use.

Briefly the mirror herein revealed lends itself to use on either side of a vehicle but is primarily intended for right-hand side use remote from the observer or driver and essentially on trucks and buses. It is simple and practical and economical and is of unitary or one-piece construction and characterized in the main by a primary or main flat rectangular image and object reflecting area which corresponds to commonly used outside truck mirrors. It is improved in that a first horizontal convex reflecting zone or area borders and merges with the upper transverse marginal edge of the main reflecting area and this curves rearwardly at the predetermined 5 inch or equivalent radius. The main mirror can be some 8 inches long and perhaps three inches wide. The first horizontal convex area corresponds to the second lower horizontal rearwardly curving convex reflecting area and is, like the first area, some three inches more or less in width. Opposite the inboard or inward longitudinal straight edge of the overall mirror the outward longitudinal edge portion is provided with a third but vertical convex reflecting area which merges with the outer longitudinal marginal edge of said main reflecting area. All of these curvate areas are selectively as well as conjointly viewable in keeping with the particular locale as well as the relationship of vehicles and objects such as may be considered to be within the zone or range of usefulness of the overall mirror. Therefore there is a main planar mirror or area, upper and lower and intermediate convex auxiliary narrower mirrors and, indeed, suitably spherical or curved and coordinating corner portions which unite the ends of the longitudinal and transverse convex areas.

With a view toward providing further background for the instant concept it can be added here that on high speed super highways access lanes are provided in a manner that the informed and experienced driver may enter the high speed highway at an angle in the same general direction of the traffic already in motion in the high speed lane. But it is to be remembered that access lanes do not always approach at the same angle. Accordingly before pulling into a high speed lane especially with a slow accelerating vehicle one must necessarily have a clear back view for at least 500 feet more or less. In lanes merging at certain angles prior patented constructions could perhaps detect the traffic situation some 500 feet back. In other cases where access lanes approach at different angles, a driver relying on previously devised and patented rear view mirrors could easily check his mirror, see no vehicle coming and pull into the high speed lane and at the same time a large truck could be bearing down on him at perhaps 70 miles more or less per hour. It follows that the blind area between the central portion and the side apron portion of prior patented adaptations make it extremely dangerous to rely upon which is another reason for offering the herein disclosed mirror with curvate areas at top and bottom and outside therefore on three marginal portions of the main mirror. Then, too, the inward edge is provided with a wall and all marginal edges including the rearwardly convex areas have coplanar outstanding attaching flanges for adequate mounting purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 2:
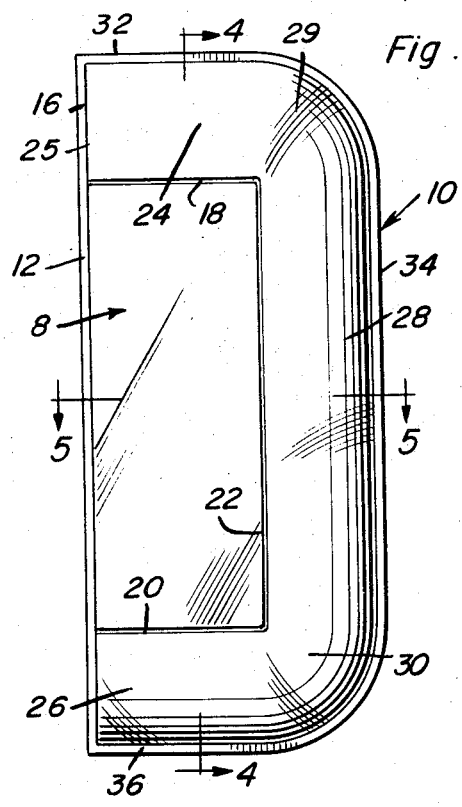
FIG. 2 is an enlarged rear elevation of the mirror by itself.
Figure 5:
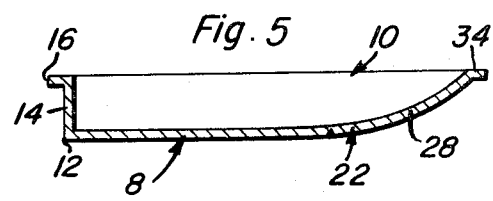

And FIG. 5 is a horizontal cross section on the line 5—5 of FIG. 2.

Figure 1:
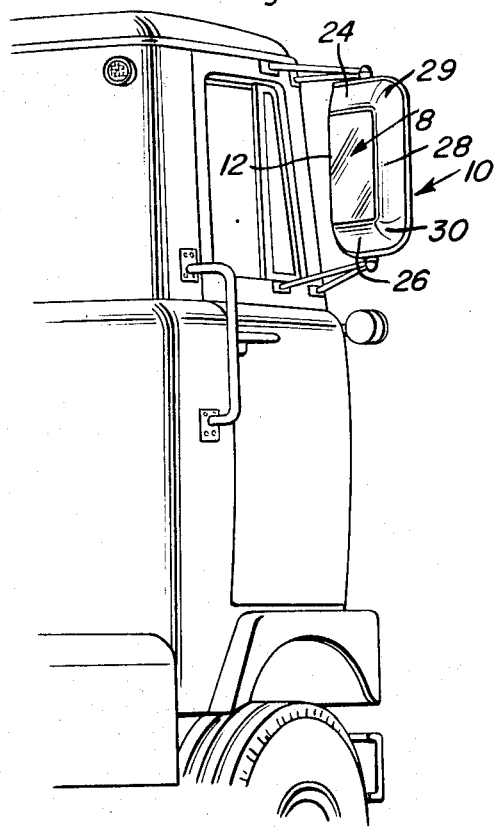
FIG. 1 is a view in perspective showing the upper right hand corner portion of a cab such as is used on a tractor trailer or the like (trucks and buses) and showing, what is more important, the bracket supported improved multi-purpose mirror as constructed in accordance with the present invention.
Figure 3:
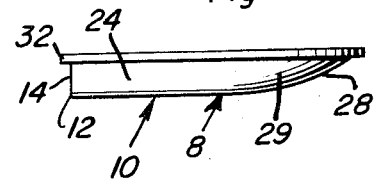
FIG. 3 is a view on a smaller scale which can be said to be the top edge or top plan view.
Figure 4:
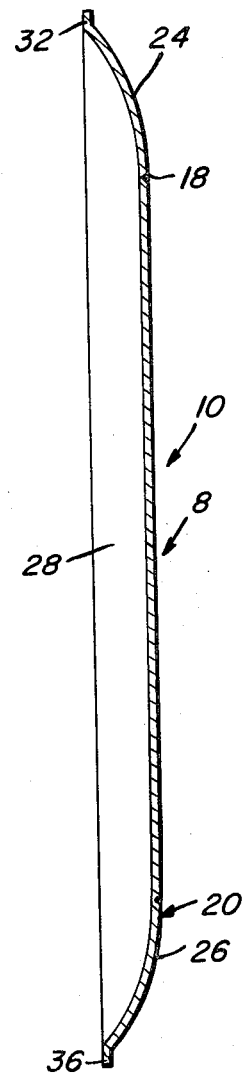
FIG. 4 is a section taken lengthwise on the longitudinal section line 4—4 of FIG. 2 looking in the direction of the indicating arrows.

The outside rear vision mirror for trucks and buses is designed primarily for suspended use as brought out in FIG. 1. It is of one piece construction and is characterized by a main flat rectangular image and object reflecting area which is denoted, generally stated, by the numeral 8. The overall finished and ready-to-use mirror, including the features desired is denoted by the numeral 10. The sharp straight edge which may be called the inboard or inward longitudinal edge is denoted by the numeral 12 and has an integral lateral or right angularly disposed lengthwise non-reflecting wall 14 one edge of which is provided with one of the flanges 16 of the flange means which is to be hereinafter more specifically set forth. The three marginal edges of the area or zone 8 which are emphasized here can be etched, painted, or otherwise delineated as denoted by the upper marginal edge 18 (FIG. 4), the lower horizontal marginal edge 20 and the intervening longitudinal marginal edge 22 which is opposite the edge 12 and parallel thereto and is denoted at 22. A first horizontal convex reflecting area borders and merges with the upper edge 18 and is denoted at 24 and curves rearwardly and has a straight left-hand end 25 flush with the edge 12. A second lower horizontal rearwardly curving convex reflecting area, like the upper horizontal convex area is provided and it is differentiated in FIG. 2 by the numeral 26. A complemental third but vertical convex reflecting area merges with the outer vertical marginal edge portion 22 and it is of requisite length and curvature and is differentiated by the numeral 28. It is commensurate in length with the edge 22 as perhaps best evident in FIG. 2. All of these three areas are selectively as well as conjointly viewable in keeping with the particular locale and relationship of vehicles (not shown) and objects within the zone and range of usefulness of the overall mirror. The horizontal and vertical convex areas 24, 26 and 28 are referred to as auxiliary to the main area or mirror 8. The adjacent terminal ends of the first and second horizontal areas are integrally and convexly united by coordinating upper and lower convexly curved junctional and corner portions the upper one of which is denoted at 29 and the lower one at 30. Reverting to the flange means 16 it may be added that companion or complemental flanges 32, 34 and 36 are integrally provided on the outer perimeter edges and are in a common plane with each other as is best shown in FIGS. 3, 4 and 5 whereby to permit the ready-to-use mirror to be mounted on a bracket. The concept pertains in part to a rear vision mirror for mounting upon either side of an automotive vehicle comprising a centrally disposed and substantially flat rectangular reflecting area, and from a common radius, rectangular cylinder section curved convex reflecting areas at the upper, outer and lower edges and triangular sphere section convex reflecting areas at the upper outer corner and lower outer corner integral with the flat reflecting area and extending rearwardly therefrom.

The corner portions of the herein disclosed rear vision mirror serve highly significant and important safety purposes. By utilizing curved convex sphere sections at the upper outer corner and lower outer corner, blind areas between the vertical curved side portion are avoided. The driver of a vehicle equipped with the disclosed rear vision mirror, traveling up an access ramp into a highway would be able to see up, out and back by viewing the upper outer corner of the rear vision mirror or traveling down an access ramp he would be able to see down, out and back through the lower outer corner of the rear vision mirror. Likewise, a driver already on the main highway would be able to see vehicles entering on uphill ramps or downhill ramps through the lower outer and upper outer corners of the rear vision mirror.

It is submitted that a careful consideration of the views of the drawing taken in conjunction with the specification and the invention as claimed, will enable the reader to obtain a clear and comprehensive understanding of the invention. Therefore a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An exterior rear vision mirror expressly designed and adapted for trucks, buses and the like comprising: a flat substantially rectangular main reflecting area, three substantially rectangular cylindrically contoured selectively and conjointly functioning auxiliary reflecting areas, namely, a first one situated along, coextensive and integrally united with an upper transverse marginal edge of said main reflecting area, a second one positioned along, coextensive and integrally united with an outward longitudinal marginal edge of said main reflecting area and oriented therewith, and a third one corresponding to said first one but coextensive and integrally united with a lower transverse marginal edge of said main area, a first generally triangular spherically contoured upper corner reflecting area junctionally joining adjacent ends of said first and second auxiliary reflecting areas, and a second generally triangular spherically contoured lower corner reflecting area junctionally joining adjacent coacting ends of said second and third auxiliary areas, said auxiliary rectangular convex areas and said junctional corner areas being derived from a common radius.

2. The rear vision mirror defined in and according to claim 1, and wherein the entire inward longitudinal marginal edge of said mirror is straight from end to end and is provided with an integral elongated straight non-reflecting wall which is disposed in a plane at right angles to the plane of said main area.

3. The rear vision mirror defined in and according to claim 1, and wherein the entire inward longitudinal marginal edge of said mirror is straight from end to end and is provided with an elongated straight wall which is non-reflecting and disposed at right angles to the main area, and also wherein said wall and outer peripheral edges of all of said convexly contoured areas, including said upper and lower corners, are provided with narrow angularly projecting outstanding endless flange means defining a mounting rim for the overall ready-to-use mirror, said flange being in a plane parallel to the plane of said main flat reflecting area.

4. An outside rear vision mirror designed primarily for suspended use on the right hand side of a truck or bus comprising a main flat rectangular vertically positionable reflecting area, a first horizontal substantially rectangular cylindrically convex reflecting area bordering and merging with an upper transverse marginal edge of said main reflecting area, a second substantially rectangular but lower horizontal rearwardly correspondingly curving convex reflecting area like said upper horizontal convex area merging with the transverse lower marginal edge of said main reflecting area, and a complemental third but vertical correspondingly curving convex reflecting area merging with the outer vertical longitudinal marginal edge of said main reflecting area, all of said areas being selectively as well as conjointly viewable in keeping with particular locale and relationship of vehicles and objects within the zone and range of usefulness of the overall mirror, said horizontal and vertical convex areas being auxiliary to but complemental with said main area, adjacent terminal ends of said first and second horizontal areas being integrally united by coordinating upper and lower convexly curved junctional triangular corner portions, the cylindrically contoured convex curvatures of said auxiliary upper, lower and vertical areas and also said junctional corner portions corresponding with each other and being derived from a common radius.

5. The rear vision mirror defined in and according to claim 4, and wherein the entire inward longitudinal marginal edge of said mirror is straight from end to end and is provided with an elongated straight wall which is non-reflecting and disposed at right angles to the main area, and also wherein said wall and outer peripheral edges of all of said convexly contoured areas, including said upper and lower corners, are provided with narrow angularly projecting outstanding endless flange means defining a mounting rim for the overall ready-to-use mirror, said flange being in a plane parallel to the plane of said main flat reflecting area.

* * * * *

UNITED STATES PATENT OFFICE
CERTIFICATE OF CORRECTION

Patent No. 3,764,201                                  Dated  October 9, 1973

Inventor(s)  Ernest Haile

It is certified that error appears in the above-identified patent and that said Letters Patent are hereby corrected as shown below:

Page 1 in the heading, after the name and address of the assignee "Allen C. Haile, Carson, Calif." insert --50% interest--.

Signed and sealed this 16th day of April 1974.

(SEAL)
Attest:

EDWARD M.FLETCHER,JR.                    C. MARSHALL DANN
Attesting Officer                         Commissioner of Patents